US012784939B2

(12) United States Patent
Cieszyński et al.

(10) Patent No.: US 12,784,939 B2
(45) Date of Patent: Nov. 3, 2026

(54) FLEXIBLE GROMMET WITH PROPELLER-SHAPED OPENING FOR CABLE HARNESS

(71) Applicant: APTIV MANUFACTURING MANAGEMENT SERVICES GMBH, Schaffhausen (CH)

(72) Inventors: Michał Cieszyński, Cracow (PL); Tomasz Slizowski, Cracow (PL); Rafał Jańczyk, Cracow (PL); Grzegorz Porebski, Podłeże (PL); Paweł Kwiatkowski, Radom (PL)

(73) Assignee: APTIV MANUFACTURING MANAGEMENT SERVICES GMBH, Schaffhausen (CH)

( * ) Notice: Subject to any disclaimer, the term of this patent is extended or adjusted under 35 U.S.C. 154(b) by 180 days.

(21) Appl. No.: 18/911,780

(22) Filed: Oct. 10, 2024

(65) Prior Publication Data

US 2025/0125074 A1 Apr. 17, 2025

(30) Foreign Application Priority Data

Oct. 13, 2023 (EP) .................................... 23203436
Aug. 22, 2024 (EP) .................................... 24195899

(51) Int. Cl.
*H01B 17/58* (2006.01)

(52) U.S. Cl.
CPC .................................. *H01B 17/583* (2013.01)

(58) Field of Classification Search
CPC .......................... B60R 16/0222; H01B 17/583
USPC .......................................................... 174/659
See application file for complete search history.

(56) References Cited

U.S. PATENT DOCUMENTS

| | | | |
|---|---|---|---|
| 9,157,564 | B2 | 10/2015 | Sellis et al. |
| 2004/0154819 | A1 | 8/2004 | Sakata |
| 2007/0026735 | A1 | 2/2007 | Pyron et al. |
| 2007/0068702 | A1 | 3/2007 | Fuller et al. |
| 2016/0039368 | A1 | 2/2016 | Shitamichi et al. |
| 2017/0012417 | A1 | 1/2017 | Teal |

OTHER PUBLICATIONS

"Extended European Search Report"; European Patent Office; Mar. 21, 2024; 6 pages.
"Extended European Search Report or Application No. 24195890. 0"; European Patent Office; mailed Feb. 7, 2025; 7 Pages.

*Primary Examiner* — Timothy J Thompson
*Assistant Examiner* — Michael F Mcallister
(74) *Attorney, Agent, or Firm* — Billion & Armitage

(57) ABSTRACT

This disclosure presents a grommet designed for accommodating cables, particularly in a vehicle wire harness application. The grommet features a sleeve body made of flexible material with two opposing openings. The first opening is uniquely shaped like a propeller in cross-section when viewed along the axial insertion direction in an unloaded state. This innovative design allows for efficient and secure cable insertion and retention within the grommet, enhancing the overall functionality and reliability of cable management systems in various vehicle applications.

20 Claims, 13 Drawing Sheets

FLEXIBLE GROMMET WITH PROPELLER-SHAPED OPENING FOR CABLE HARNESS

CROSS-REFERENCE TO RELATED APPLICATION

This application claims the benefit of and priority to European Patent Application No. 24195899.0 filed on Aug. 22, 2024, and European Patent Application No. 23203436.3 filed on Oct. 13, 2023, the contents of each of which are incorporated by reference herein.

TECHNICAL FIELD

The disclosure generally relates to a grommet for cables, in particular for sealing a cable or for sealing a cable harness, e.g., in automotive applications.

BACKGROUND

In recent years, the automotive sector has been facing a shift towards electric vehicles. This is accompanied by an increasing number of electrical and electronic devices that need to be connected, which results in a rapid increase of electric cables and/or harnesses to facilitate provision of electrical connection. In its simplest configuration a grommet is a tube or ring through which an electrical cable passes. The grommet is usually inserted in holes in certain materials, such as e.g., the bulkhead of a vehicle, in order to protect, improve friction or seal cables passing through it, from a possible mechanical or chemical attack.

Increasingly stringent requirements for the quality of workmanship, repeatability, and production efficiency drive the introduction of automation and improvement of production processes. Currently, the production process related to the application of e.g., the bulkhead grommet of a vehicle is one of the most complicated, time-consuming, and high-quality steps related to the construction of the electrical harness. It is cumbersome and requires operators to spend a lot of time and energy. In view of the foregoing, there is a need for improved grommets.

SUMMARY

It is thus an object of the present disclosure to overcome some or all the deficiencies of the prior art. It is in particular an object to provide an improved grommet, which allows to receive and guide electric cables and/or harnesses with connectors easily and in a flexible manner therethrough. Other objects which may be overcome in the present disclosure are the production of a harness by reducing or eliminating all difficult and cumbersome steps in the process, relieving the operators of the production line and/or providing the opportunity to automate the process of building the harness (e.g., by allowing the assembly of connectors before placing the harness in the grommet).

An aspect of the disclosure relates to a grommet for receiving cables, such as a harness for a vehicle. The grommet comprises a sleeve body of a flexible material having two opposed openings, where at least one of the openings in unloaded condition has a cross-sectional shape, as seen in axial insertion direction, of a propeller (also denoted “propeller shape” in the following).

Typically, grommets have two opposed openings for the insertion of cables wherein at least one opening has a dimension, such that the opening portion tightly wounds around the inserted cable(s) for a preferably sealing engagement. Thus, the opening has a diameter in unloaded condition that is smaller than the diameter of the cables to be inserted. Due to the flexibility of the material of the grommet, the opening is stretched when inserting the cables.

The standard grommet material currently employed e.g., in the automotive industry can be stretched up to 400%. The design of a propeller shaped opening allows a significant increase in the clearance of the grommet without the need to stretch the material, as the propeller shaped opening can be unfolded, thereby increasing the open cross-sectional area for the reception of the cable(s) or harness. This makes it possible to adjust the opening to cable/harness diameters, e.g., above 50 mm, and advantageously provides an easy way to assemble without the need to use large forces. This in turn eliminates the risk of damage to the material of the grommet and the components received by the grommet. The solution allows to stay with the current size of mounting opening or smaller with the possibility of using a wiring harness with a much larger diameter than in the art.

In a preferred embodiment, the propeller shape comprises at least two blade portions. The blade portions preferably allow to unfold the opening, thereby increasing the free and usable cross-sectional area when inserting a component. In contrast to the essentially circular openings of the prior art, the opening can be increased without necessarily stretching the material. The skilled person will however understand that a stretching of the material is also desired, as it improves or enables a sealing engagement of the grommet with the inserted component. However, the structural shape of the opening in form of a propeller provides an additional means for increasing the free cross-sectional area (i.e., the usable, unobstructed area through which components, such as cables can be inserted).

In another preferred embodiment, the propeller shape comprises at least three blade portions, preferably exactly four blade portions.

By increasing the number of blade portions, it is possible to increase the free cross-sectional area in unfolded condition. Further, when unfolding the propeller shape the cross-sectional area of the unfolded shape is closer to a circular shape, the larger the amount of propeller blades. This advantageously facilitates the insertion of components into the sleeve body of the grommet.

In a preferred embodiment, the blade portions are curved. The provision of the blade portions with a curvature increases the flexibility of the arrangement. In other words, the curvature facilitates the unfolding of the opening and increases the free cross-sectional area, which can be achieved.

Further preferred, the blade portions have a convex edge and an opposing concave edge. These shapes facilitate the unfolding of the propeller shape and increase the free cross-sectional area.

In a further preferred embodiment, the propeller shape comprises a central hub portion and blades extending radially outward from the central hub portion.

The central hub portion facilitates the initial insertion of components through the grommet and offers the possibility to provide for a relatively large free cross-sectional area also in the folded condition. The skilled person will understand that the folded condition is the initial, default configuration of the grommet, when no outer forces are applied to it. Therefore, in the present description also the expression “unloaded condition” is used as a synonym for the expression “folded condition”.

Preferably, the sleeve body has an axial extension and comprises first and second portions, wherein the first portion has a cross-sectional shape, as seen in axial insertion direction, of a propeller, and the second portion has preferably a cross-sectional shape of a circle.

The skilled person will understand that the axial extension of the sleeve body of a grommet is in the insertion direction of the components, such as cables or wire harnesses etc. The total axial extension of the sleeve body is from one opening to the other. It is generally preferred that the propeller shape is not just provided at the opening itself, but that rather the sleeve body itself has a cross-sectional shape of a propeller for a substantial part of its overall length. Thus, the cross section of the sleeve body is not the same over the total length of the sleeve body, but it's different for different portions, in particular circular in the second portion and propeller shaped in the first portion. Preferably, there is a short transition region between the first and second portion, where the propeller shape merges into the circular shape of the second portion.

Preferably, the opening opposite the propeller shaped opening has essentially a circular cross-sectional shape. Even more preferred, this circular opening has a larger diameter and/or larger free cross-sectional area than the opposite opening, so that the grommet tapers from the one opening to the other, propeller shaped opening. Such a tapering shape facilitates the insertion of the components from the circular opening to the opposite propeller opening.

In this context, it is preferred that the first portion has an extension of at least 30% of the axial total length of the sleeve body, preferably at least 50%, more preferably at least 70%, even more preferred at least 80%.

By extending the cross-sectional shape in form of a propeller along a substantial part of the axial length off the sleeve body the unfolding of the propeller shape is facilitated. Further, by providing a substantial part of the sleeve body with a propeller shaped cross section, the insertion of a component into the grommet is overall facilitated, as the advantageous effects of the propeller shape can be used for a larger portion of the sleeve body.

Preferably, the first portion has an extension of at most 95% of the axial total length of the sleeve body, preferably at most 90%, more preferably at most 80%. While it is advantageous, that the propeller shaped cross section is provided over a substantial length of the sleeve body, it is preferred that it does not extend over the whole length, but that rather the second portion, which has preferably a circular cross section, has a certain minimum extension as well. Thereby, it is possible to choose optimized cross sections for the two openings of the grommet, respectively the sleeve body. For example, it is advantageously possible to use a relatively large and circular opening on the insertion side of the grommet and a propeller shaped cross section for the opposite opening, respectively for the portion of the sleeve body after the insertion side opening. Thereby, the initial insertion of the components through the grommet is facilitated.

Preferably, the first portion starts from the propeller shaped opening and extends in the direction of the opposed opening of the sleeve body.

As also described above, it is preferred that the propeller shaped cross section is not just provided at one of the openings, but that rather the sleeve body itself has a propeller shaped cross section over a substantial axial length thereof. It is most preferred that the propeller shaped cross section starts from one opening and extends to the opposite opening for a certain length, as mentioned above. At a certain point, the propeller shaped cross section merges into a different cross section, in particular a circular cross section, which then may form the opposite opening of the grommet, respectively sleeve body.

In a preferred embodiment, the cross-sectional area of the first portion increases, preferably steadily, from said propeller shaped opening in the direction of the opposed opening of the sleeve body.

Generally preferred, the sleeve body tapers from one opening to the other, and in particular from one opening to the opening with the propeller shaped cross section. In embodiments where the propeller shaped cross section extends over a substantial length of the sleeve body, it is likewise preferred that the overall shape of the sleeve body is tapered from one end to the other, with the propeller shaped opening being at the end of the sleeve body with the smallest diameter. It is further preferred, that this increase in the cross-sectional area from the smallest diameter to the largest diameter is steady, i.e., without any larger steps or interruptions, which would negatively affect the insertion process of the components into the grommet.

Generally preferred, the propeller shape of the opening is adapted to be unfoldable and in unfolded condition the cross-sectional area is increased compared to the folded condition.

As already mentioned above, the folded configuration is the default configuration of the grommet, when no external forces are acting on it. The folded configuration is thus the shape of the unloaded grommet, i.e., without external forces. Due to the particular propeller shape of the cross section, it is possible to increase the free diameter by unfolding the propeller shape into a more circular cross-sectional shape, without necessarily stretching the material (although stretching of the material is not excluded but is rather a desired additional means for increasing the free cross sectional area and essentially necessary, if a tight sealing between grommet and component is required).

Preferably, the propeller shape of the opening has in folded, i.e., unloaded, condition a folded cross sectional area A, and in unfolded condition a cross sectional area of at least 1.5×A, more preferably at least 2×A, even more preferably at least 2.5×A and most preferably at least 3×A, without stretching the material.

This means, that in the fully unfolded, but not yet stretched condition, the free cross-sectional area is larger than in the folded default configuration. If, for example, the folded cross-sectional area A is 100 $mm^2$, the unfolded configuration may have at least 150 $mm^2$, more preferred at least 230 $mm^2$ etc.

Preferably, the perimeter length of the cross-sectional area of the propeller shape is substantially the same in the folded and unfolded configuration.

One advantage of the propeller shape is that the cross-sectional area is rather small compared to the perimeter length in the folded configuration. Thereby, space may be saved if it is not needed. In the unfolded configuration, it is advantageous that the cross-sectional area is rather large compared to the perimeter length. Thereby, cables that require a larger volume can be received in an improved manner. Thus, the free cross-sectional area can be increased (e.g., from the folded to the unfolded configuration) without stretching the material, since the perimeter length is maintained.

Generally preferred in all the embodiments described herein, the flexible material is a polymer, preferably rubber, in particular ethylene-propylene-diene rubber (EPDM), or a rubber-like material, in particular TPE or TPU.

The flexible material has the advantage that the grommet can be easily stretched to a certain size (in addition to the increase in free cross-sectional area due to the propeller shape), so as to facilitate the insertion of one or more cables therethrough, in particular if the cables have a connector attached. The rubber has the advantage that it can be easily procured and constitutes a cost-effective material. Hence, manufacturing of the grommet can be improved. Further, it has proven beneficial to use materials which are already accepted in different industrial fields.

Preferably, the second portion comprises a latching collar with a conical surface and a flange for mounting the grommet within a mounting hole of a vehicle. By the latching collar, the grommet can be mounted to a mounting hole of the vehicle, preferably to a mounting hole in the bulkhead or fire wall of a vehicle, by pushing the grommet into the mounting hole, wherein the conical surface of the latching collar latches with the edge of the mounting hole. In latched condition the flange abuts the surface-preferably a surface of the bulkhead or fire wall-around the mounting hole.

Preferably, the latching collar further comprises a spring element for increasing the stiffness of the latching collar. The spring element increases the stiffness of the latching collar to increase the holding force of the mounted grommet.

Preferably, the spring element is made of a metal or a plastic material having a higher rigidity than the material of the latching collar. Thus, the spring element supports the latching collar without adopting much space. Further, the material of the latching collar and the material of the overall grommet itself can be very soft to improve the sealing properties and allows for an easy introduction of a wire harness.

Preferably the latching collar further comprises a ring-shaped stiffness-improvement section opposite to the conical surface, wherein the stiffness-improvement section is integral with the latching collar and comprises wall parts and hollow parts. The stiffness improvement section also increases the stiffness of the latching collar but is favourably made of the same material as the latching collar and the overall grommet. The wall parts support the latching collar from the inner side and the hollow parts provide the needed flexibility of the second portion for the mounting of the grommet.

Preferably, the wall parts extend in axial direction and are arranged in a harmonica fashion around the ring-shape of the stiffness improvement section. The wall parts by the harmonica fashion arrangement have triangle shaped sections that surround the hollow parts. This arrangement provides on optimized relationship of stiffness and elasticity of the second section for mounting the grommet.

Preferably, in other embodiments, the wall parts extend in axial direction and have a hollow round or oval section. Other shapes for the wall parts and hollow parts are possible and favourable to increase the latching force of the latching collar.

Preferably, the grommet further comprises a ring-shaped plastic clip arranged at the second portion for mounting the grommet within a mounting hole of a vehicle, wherein the plastic clip comprises clip elements extending radially to the outside for latching with a mounting hole of a vehicle. The ring-shaped plastic clip can replace the latching collar to further improve the latching force as the plastic clip can be made of a stiffer material than the latching collar.

Preferably, the plastic clip consists of two clip pieces that have snap-lock connection elements for locking the two clip pieces together during mounting of the plastic clip to the second portion. A two-piece arrangement of the plastic clips enables an easy installation of the plastic clip to the second portion P2.

Preferably, in another embodiment the plastic clip is partially overmolded by the latching collar, wherein the clip elements are not overmolded. Thus, the latching force of the latching collar can be increased by an integrated plastic clip with free clip elements.

Preferably, the sleeve body further comprises a third portion that extends in axial direction from the second portion opposite to the first portion. The third portion may serve for supporting and/or mounting a cable or wire harness also on the opposite side of the first portion, i.e., on the other side of the bulkhead or fire wall of a vehicle.

Preferably, the third portion has a substantially round section and comprises axial slots.

DETAILED DESCRIPTION

Figure 1:
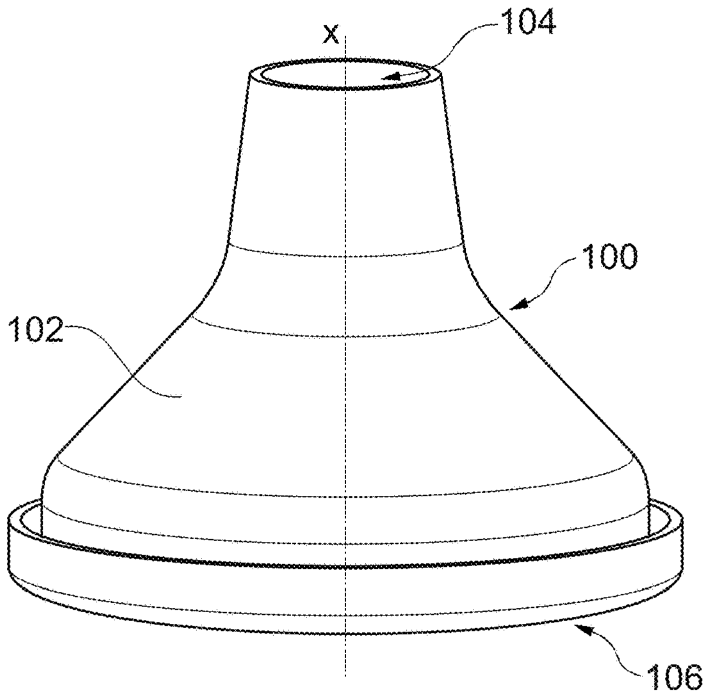
Fig. 1 (prior art)
FIG. 1 illustrates an isometric side view of a grommet according to the prior art.

The term "harness" as used herein may also be referred to as a cable harness, wire harness, wiring harness, cable assembly, wiring assembly. The term may be understood as an assembly of electrical cables or wires for transmitting signals or electrical power. The harness may comprise one or more cables/wires. The cables/wires may be bound together.

The term "stretching" as used herein in the context of the material may refer to an elongation of the material such that the material expands and/or strains. Thereby, a stress in the material is caused. As an illustrative example, if the material were to behave according to a linear elastic stress strain curve, a stress increases in proportion to the strain and vice versa. The term "unfolding" as used herein in the context of the material may refer to a variation in shape of the material without substantially causing a stress.

In the subsequent passages, embodiments are described with reference to the accompanying figures in more detail. It is noted that further embodiments are certainly possible, and the below explanations are provided by way of example only, without limitation. Throughout the present figures and specification, the same reference numerals refer to the same elements in all embodiments. The figures may not be to scale, and the relative size, proportions, and depiction of elements in the figures may be exaggerated for clarity, illustration, and convenience.

FIG. 1 illustrates a grommet 100 according to the prior art in a partially perspective side view. The grommet 100 has a sleeve body 102 made of a flexible material, such as a rubber, with two opposing circular openings 104 and 106. One can see that the opening 106 has a substantially larger diameter and thus free cross-sectional area than the opposite opening 104. The opening 106 is thus the insertion opening, through which the components are inserted through the grommet 100. The sleeve body tapers along its axial direction from opening 106 to opening 104. The axial direction is indicated by the dashed line and has the reference number x in FIG. 1. The skilled person will understand that the axial direction is the insertion direction of the components.

Figure 2:
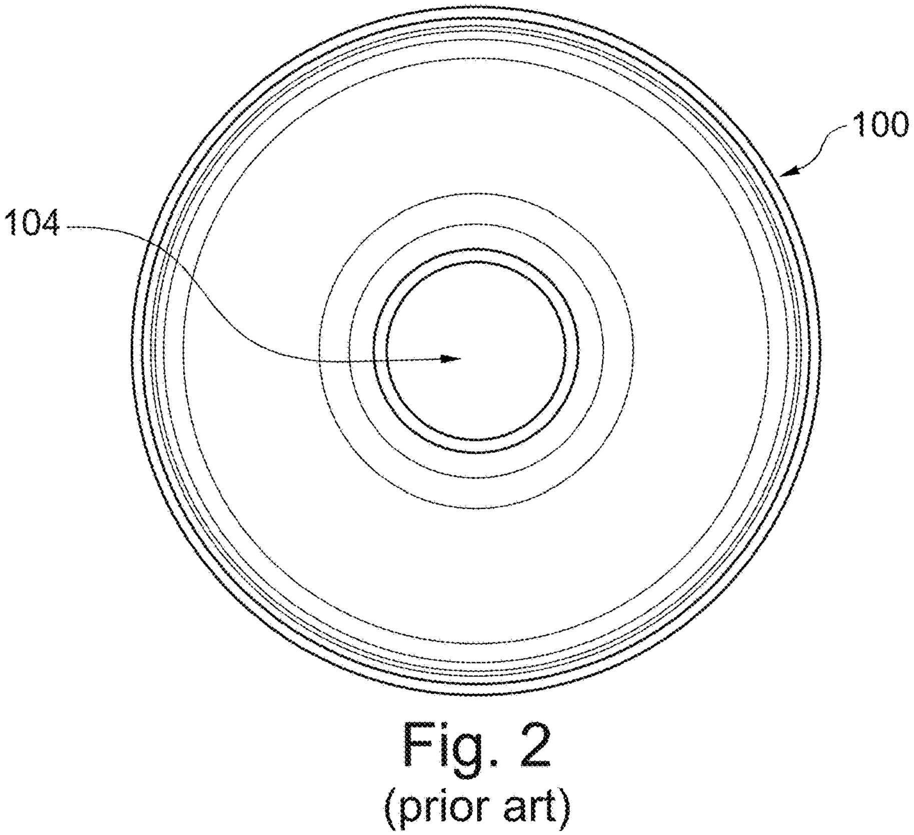
Fig. 2 (prior art)
FIG. 2 shows a top view of the grommet of FIG. 1, according to the prior art.

FIG. 2 shows the prior art grommet of FIG. 1 in a top view as seen in axial direction x from opening 104.

Figure 3:
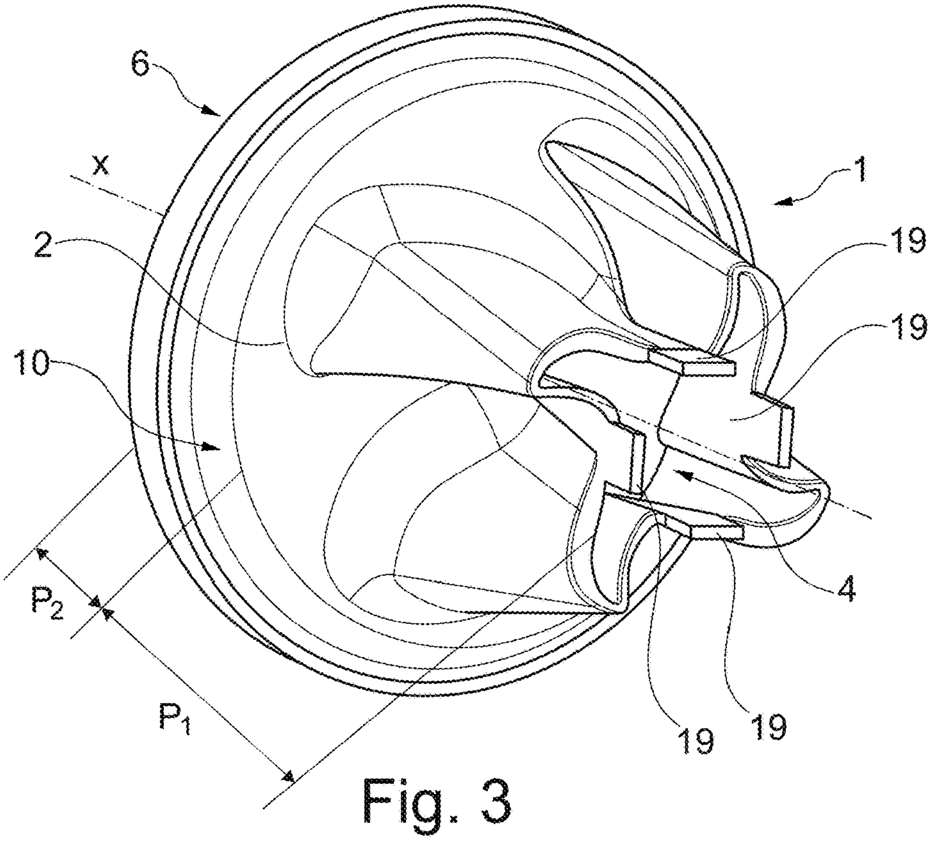
FIG. 3 illustrates an isometric view of a grommet in accordance with some embodiments.

FIG. 3 shows a grommet 1 of a first embodiment in a perspective side view. The grommet 1 comprises a sleeve body 2 of a flexible material and has two opposed openings 6 and 4. The grommet 1 is shown in a folded, unloaded condition, with no external forces acting on it. The opening 4 has a cross-sectional shape, as seen in axial direction, of a propeller.

From the perspective view of FIG. 3, one can also see that the sleeve body 2 has an axial extension and comprises essentially first P1 and second P2 portions. The first portion P1 has a cross-sectional shape of a propeller and the second portion P2 has a cross-sectional shape of a circle. In between the portions P1 and P2 there is a transitional portion 10 in which the propeller shape merges into the circular shape of the second portion P2. Although the figures are not necessarily true to scale, one can derive from the figure, that the first portion P1 is substantially larger than the second portion P2. In the show embodiment, the first portion P1 has an extension off approximately 80% of the total length of the sleeve body 2, as measured in axial direction.

The first portion P1 starts from the opening 4 and extends in the direction of the opposed opening 6 of the sleeve body 2. One can see from the perspective view, that the overall shape of the grommet tapers from opening 6 towards opening 4. In the first portion P1, the sleeve body 2 has a cross-sectional shape of a propeller and the cross-sectional area increases steadily from the opening 4 in axial direction to the opposed opening 6 of the sleeve body 2.

Figure 4:
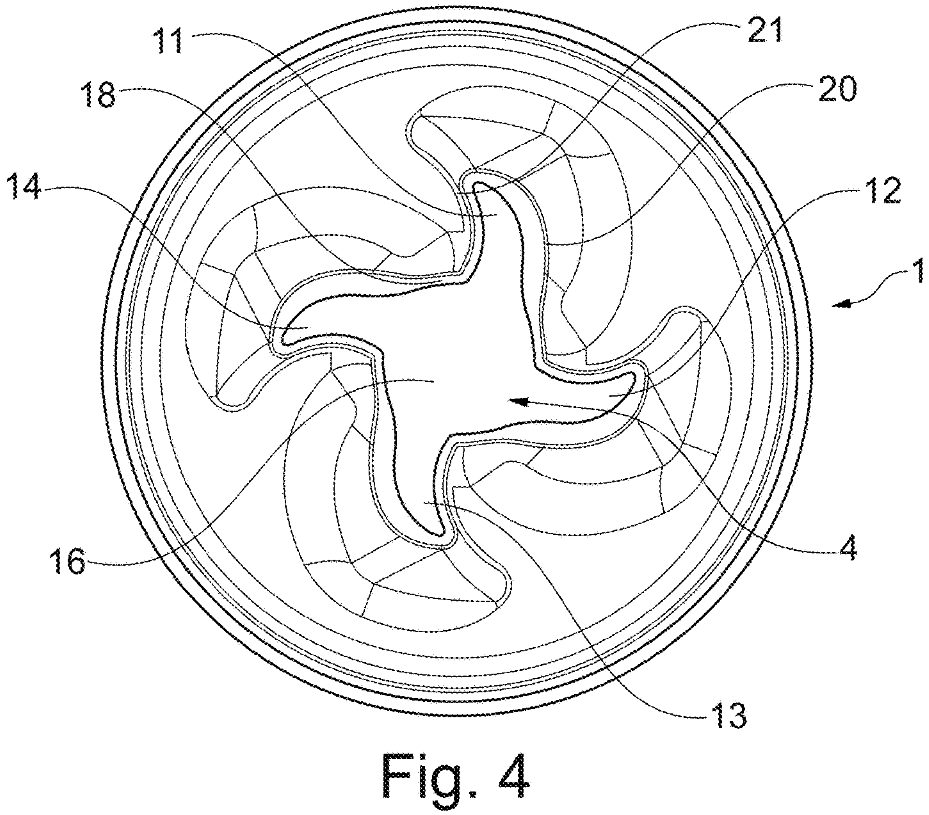
FIG. 4 shows a top view the grommet of FIG. 3 in accordance with some embodiments.

FIG. 4 shows the grommet 1 of FIG. 3 in a top view seen in axial direction and from above the propeller shaped opening 4. One can see that the propeller shaped opening 4 comprises a hub 16, from which four propeller blade portions 11, 12, 13 and 14 radially extend outward. The blade portions are curved, and each has a convex edge 20 and an opposing concave edge 21 (in the figure, only one blade portion 11 is provided with reference signs for the edges to increase clarity).

The propeller shaped opening 4 has a perimeter 18. The skilled person will understand that it is possible to unfold the propeller shape by disposing the walls of the first portion P1 outwardly, respectively by pushing or pulling the perimeter walls 18 outwardly. The propeller shape visible in for example FIG. 4 will in that case be transformed towards a circular shape, thereby increasing the free cross-sectional area, without increasing the length of the perimeter 18. In other words, the walls do not need to be stretched to increase the free cross-sectional area, but that can be achieved by deforming (unfolding) the propeller shape.

Obviously, since the material of the sleeve body 2 is flexible and preferably made of e.g., a rubber like material it is additionally possible to stretch the material to increase the free cross-sectional area even further, to allow the easy insertion of cables or harnesses with a large diameter.

Figure 5:
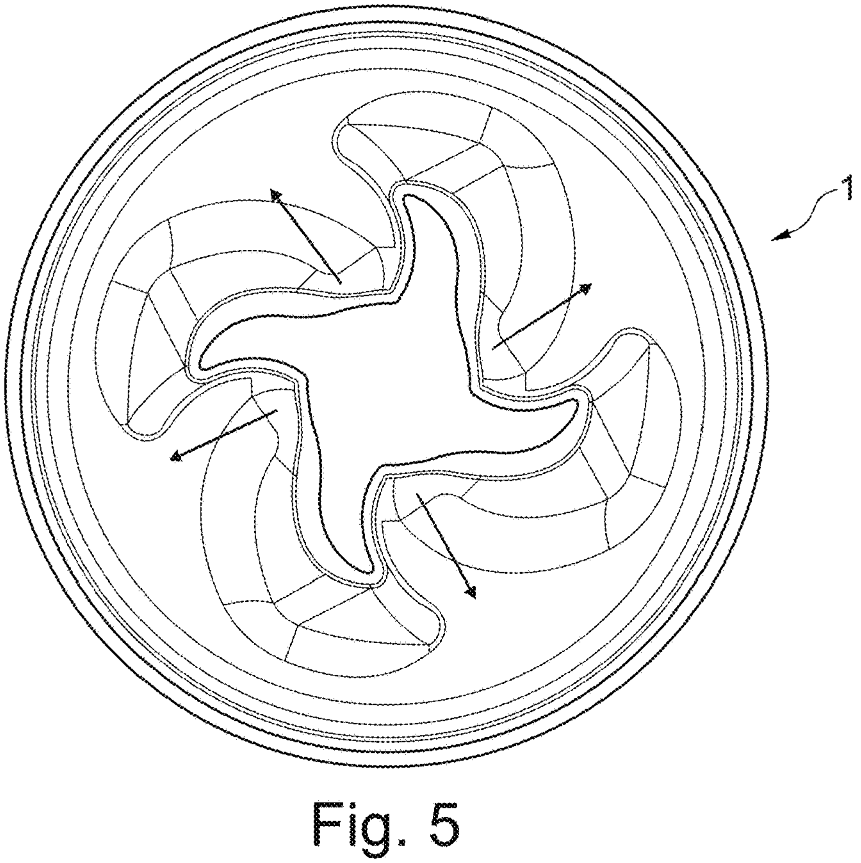
FIG. 5 shows the top view the grommet of FIG. 3 with arrows indicating a stretching direction in accordance with some embodiments.
Figure 6:
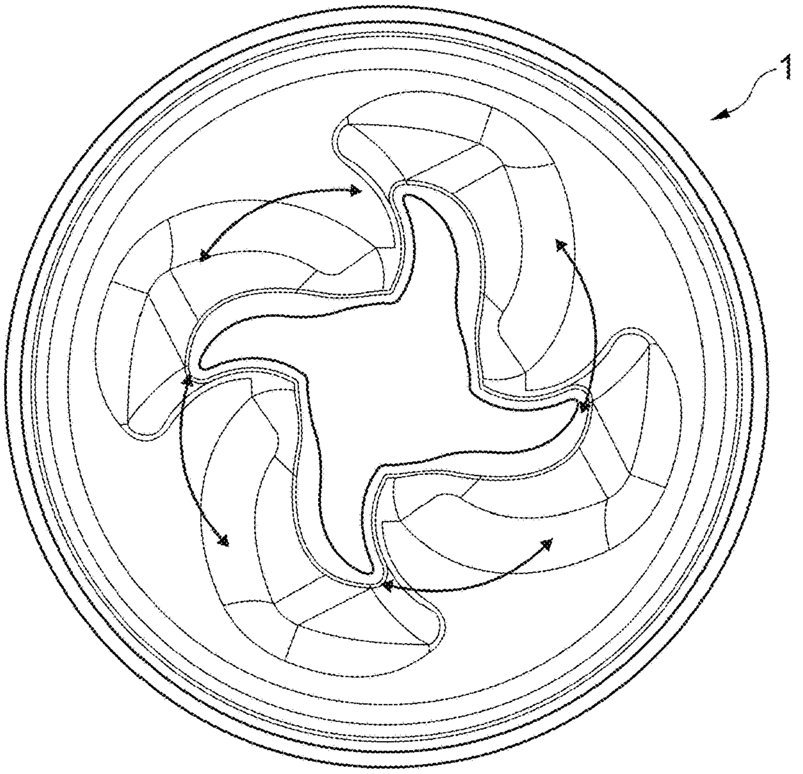
FIG. 6 shows the top view the grommet of FIG. 3 with arrows indicating an unfolding direction in accordance with some embodiments.
Figure 8:
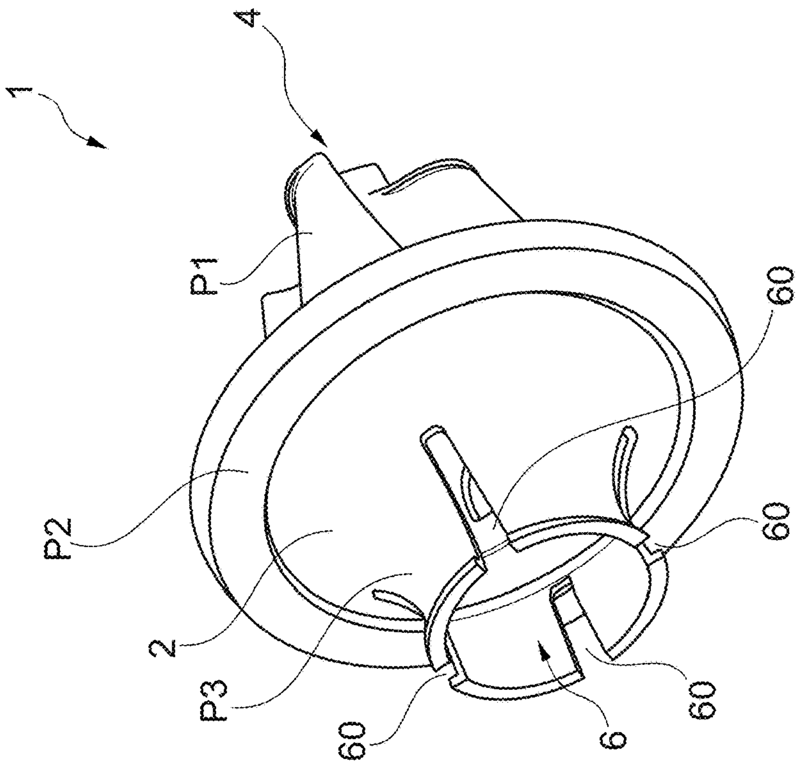
FIG. 8 shows an isometric view of the grommet of FIG. 7 in a different perspective in accordance with some embodiments.
Figure 7:
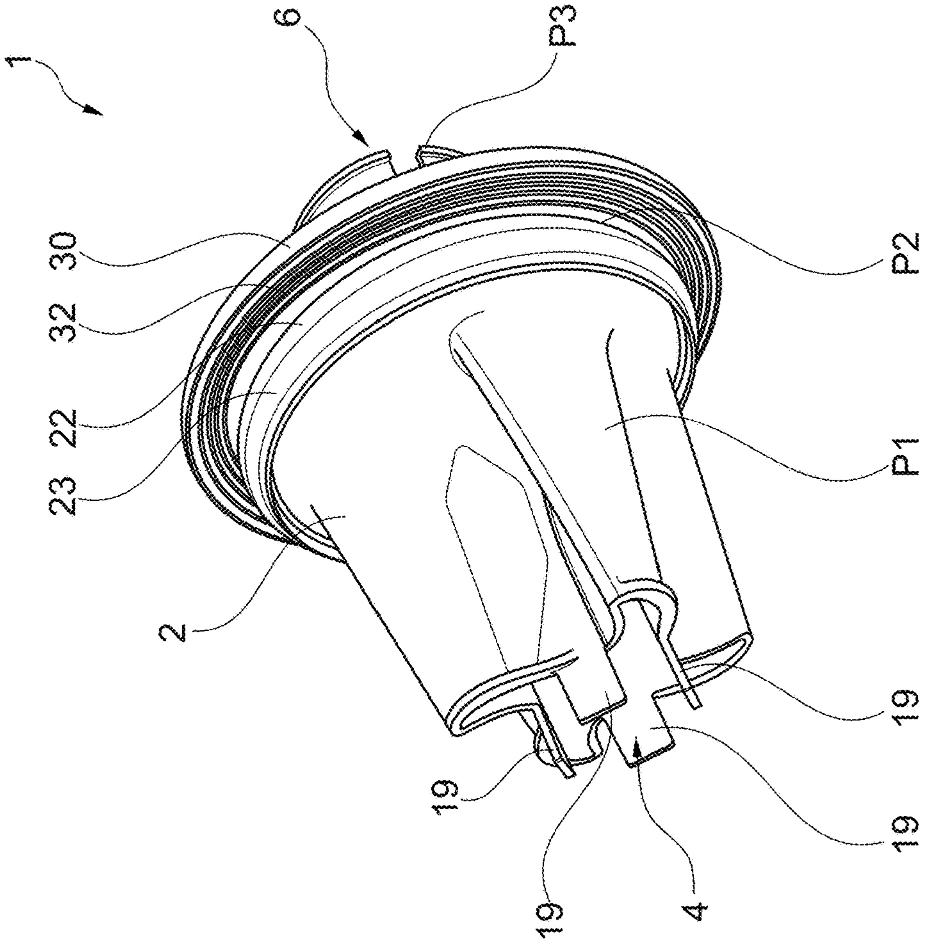
FIG. 7 shows an isometric view of a second grommet in accordance with some embodiments.
Figure 9A:
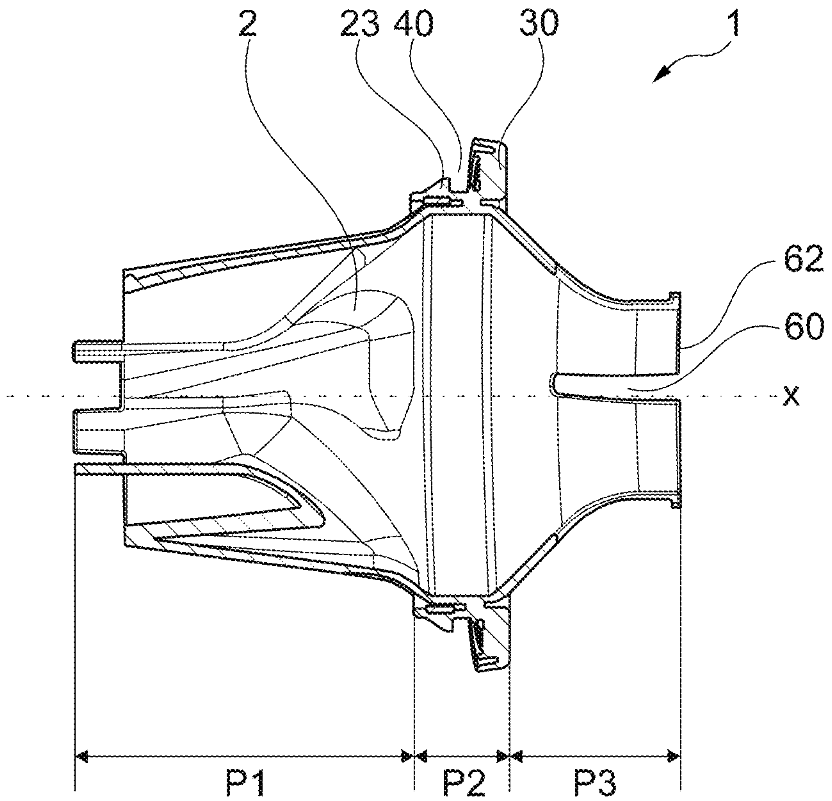
FIG. 9A shows a cross-sectional side view of the grommet of FIG. 7 in accordance with some embodiments.
Figure 9B:
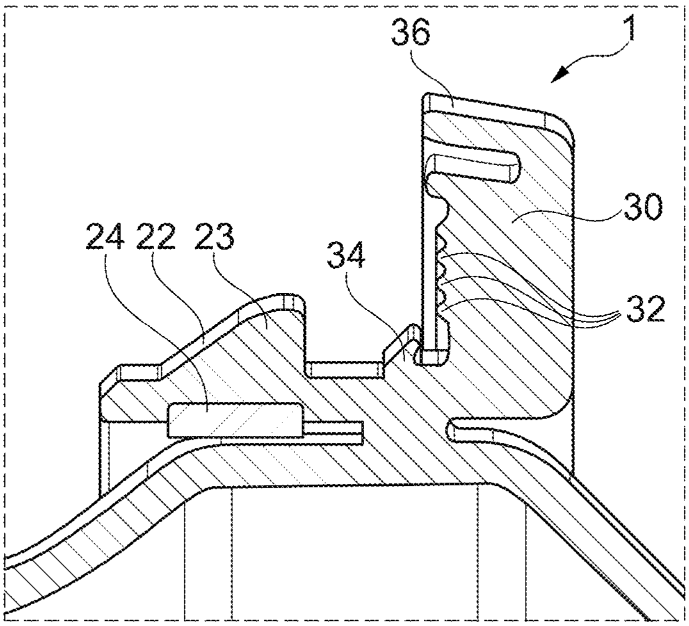
FIG. 9B shows a detail view of FIG. 9A showing the mounting area of the grommet in more detail in accordance with some embodiments.
Figure 11:
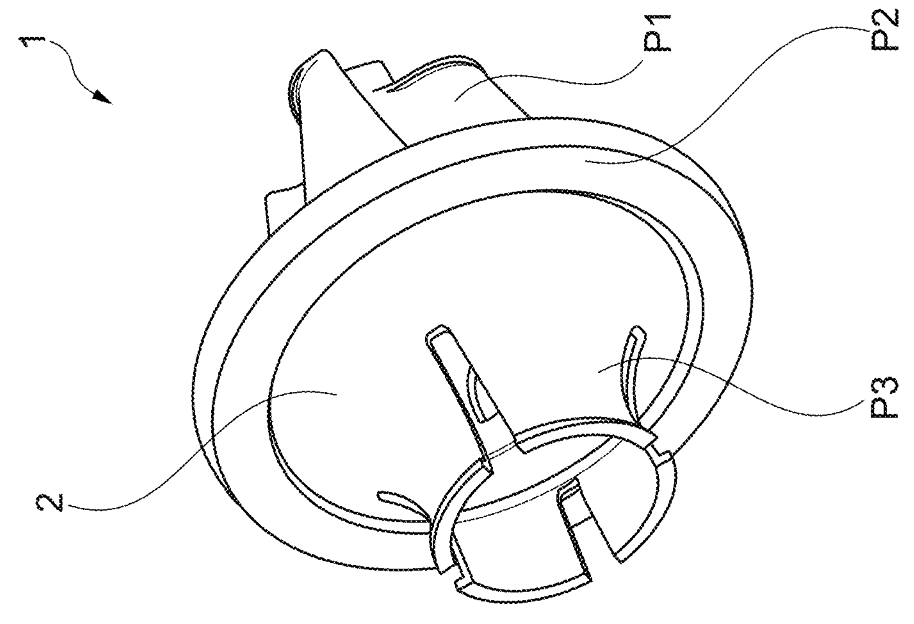
FIG. 11 shows an isometric view of the grommet of FIG. 10 in a different perspective in accordance with some embodiments.
Figure 10:
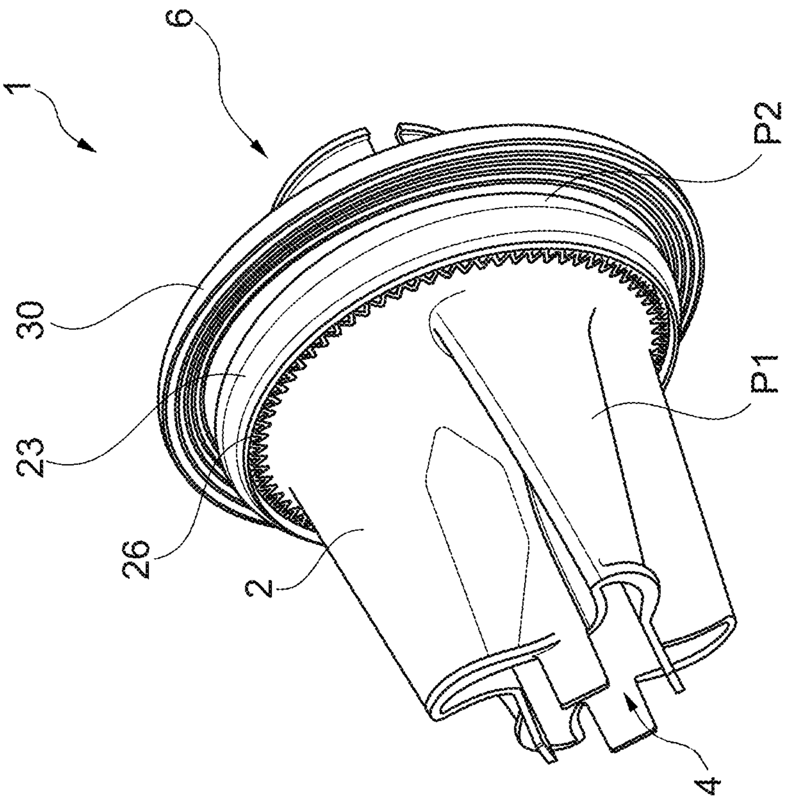
FIG. 10 shows an isometric view of a third grommet in accordance with some embodiments.

A stretching of the material can be done by for example pulling the outer walls of the first portion in the direction as indicated by the arrows in FIG. 5. A deforming or unfolding of the propeller shape can for example be achieved by applying a rotational movement as indicated in FIG. 6.

FIG. 3 further shows extension plates 19 that extend in axial direction x from the edge of the propeller shaped opening 4 of the first portion P1. As shown, preferably four extension plates 19 can be provided, wherein the number of the extension plates 19 corresponds to the number of the four propeller blade portions 11, 12, 13 and 14. However, other numbers of extension plates 19 can be used. The extension plates 19 are used to better seal or connect the grommet 1 by an adhesive tape to a wire harness (not shown) inserted into the grommet 1. An adhesive tape (not shown) can be wound around the extension plates 19, such that the tape sticks well to the extension plates 19 and in the area in-between the extension plates 19 the tape sticks to the wire harness. Thus, an improved sealing of the grommet 1 to the wire harness can be achieved.

FIGS. 7, 8, 9A, and 9B show a grommet 1 according to a second embodiment. The grommet 1 of the second embodiment corresponds essentially to the grommet 1 of the first embodiment but additionally comprises a third portion P3 that extends in axial direction x from the second portion P2 opposite to the first portion P1. The third portion P3 serves for supporting and/or mounting a cable or wire harness also on the opposite side of the first portion P1, i.e., on the other side of the bulkhead or fire wall (not shown) of a vehicle. The third portion P3 has a substantially round section and comprises axial slots 60. Further, the third portion P3 is tapered to an opening 62 thereof. Preferably, the third portion is made integral with the first and second portions P1, P2 and is made of the same elastic material as the sleeve body 2.

In addition, the FIGS. 7, 8, 9A, and 9B illustrating the second embodiment show more details of the second portion P2, which is the mounting portion of the grommet 1. The elements of the second portions P2 of the second and further embodiments can also be present in the first embodiment. The second portion P2 comprises a latching collar 23 with a conical surface 22 and a flange 30 for mounting the grommet 1 within a mounting hole. The conical surface 22 is tapered in axial direction x and has its smaller diameter towards the propeller shaped opening 4 and its larger diameter towards the flange 30. Thus, when the grommet 1 is inserted into a corresponding mounting hole, the latching collar 23 latches with the edge of the mounting hole and the flange 30 abuts the edge of the mounting hole from the other side. Thereby the latching collar 23 and the flange 30 form a ring-shaped gap 40 for the wall of the mounting hole (not shown). Thus, the grommet 1 is securely held at a mounting hole of a bulkhead or fire wall (not shown).

The latching collar 23 further comprises a spring element 24 for increasing the holding force of the grommet 1. The spring element 24 is arranged at the latching collar 23 so as to improve the stiffness of the latching collar 23. Thus, as particularly shown in FIG. 9B the spring element 24 is arranged at the inner diameter of the latching collar 23 below the conical surface 22.

The spring element 24 is preferably a flat ring-shaped element. It may be made of a metal or a plastic material having a higher rigidity than the material of the latching collar 23 to improve the stiffness of the overall latching collar 23.

The flange 30 is preferably ring shaped and made integral with the sleeve body 2 out of the same material. During insertion of the grommet 1 into a mounting hole the flange 30 stops further movement of the grommet 1 in assembly direction, which corresponds to the axial direction x. Preferably, flange 30 and latching collar 23 generate a pressure in-between to hold the edge of the mounting hole without substantial play. For doing so the flange 30 preferably comprises sealing or compensating rings or ribs 32 that can be slightly compressed after mounting for compensating any material tolerances. Further, the flange 30 can comprise an inner lip 34 that seals the grommet 1 in respect to the inner diameter of the mounting hole. In addition, the flange 30 can comprise an outer lip 36 that seals the grommet 1 in respect to the side face of a mounting wall.

Figure 12:
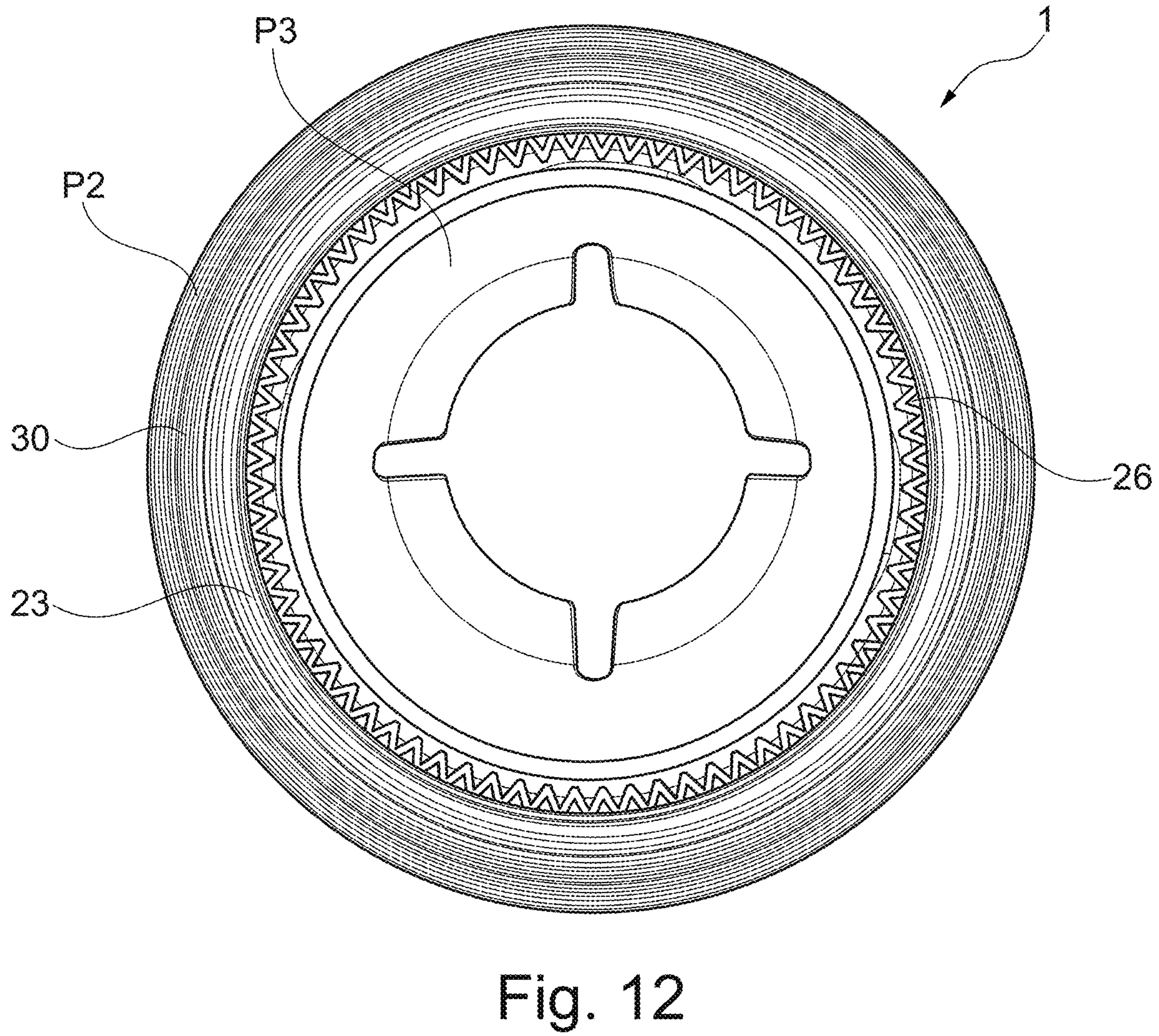
FIG. 12 shows a cross-sectional axial view of the grommet of FIG. 10 in accordance with some embodiments.
Figure 13B:
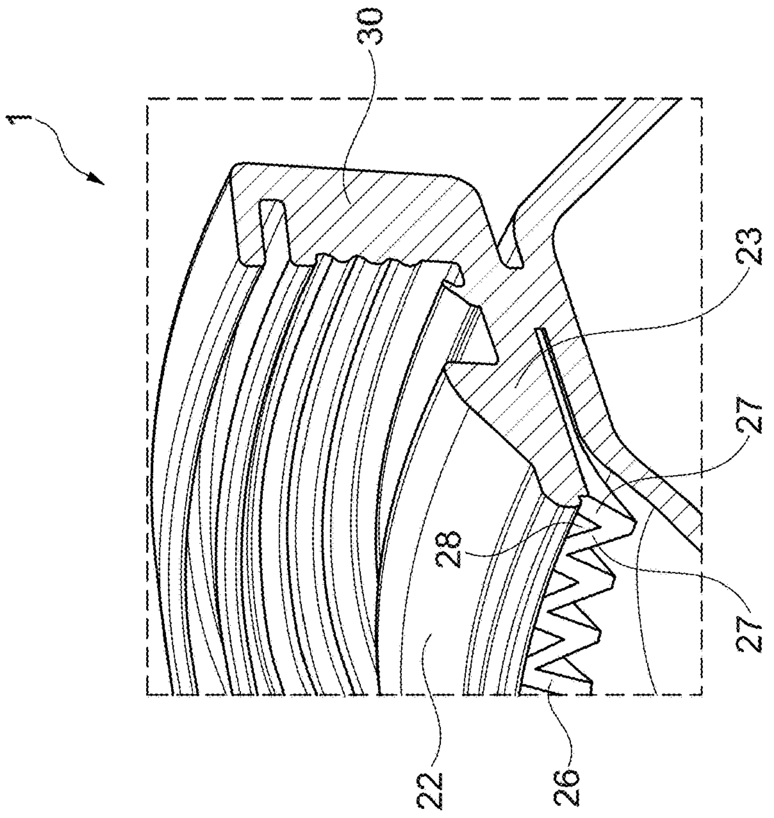
FIG. 13B shows a detail cross-sectional view of the grommet of FIG. 10 showing the mounting area of the grommet in more detail in accordance with some embodiments.
Figure 13A:
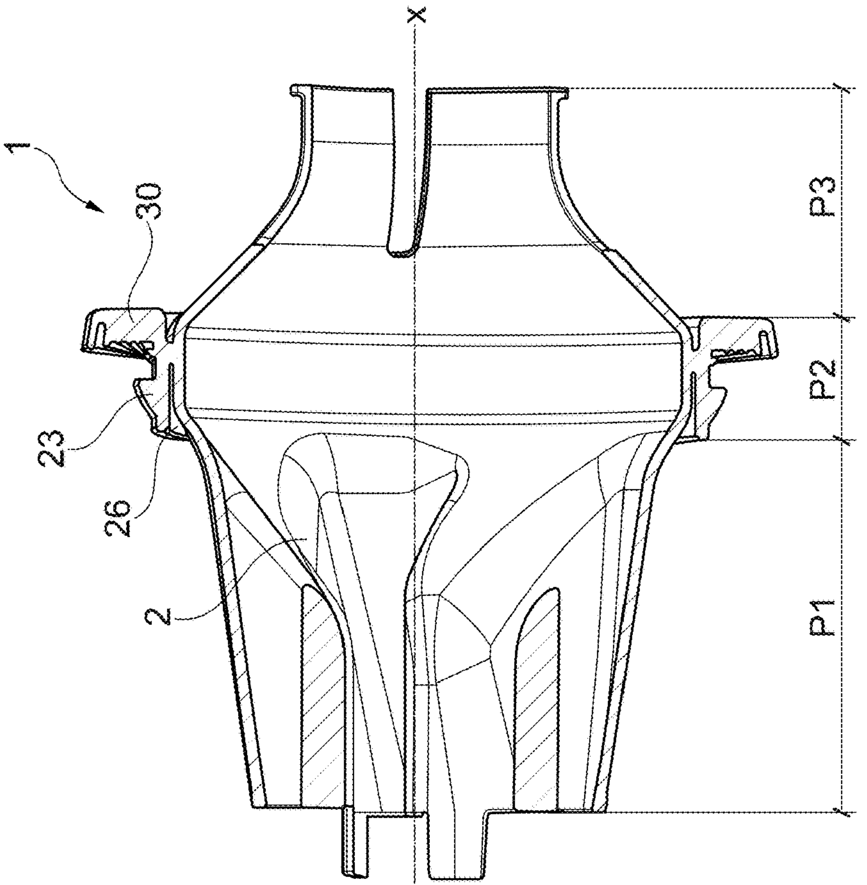
FIG. 13A shows a cross-sectional side view of the grommet of FIG. 10 in accordance with some embodiments.
Figure 14:
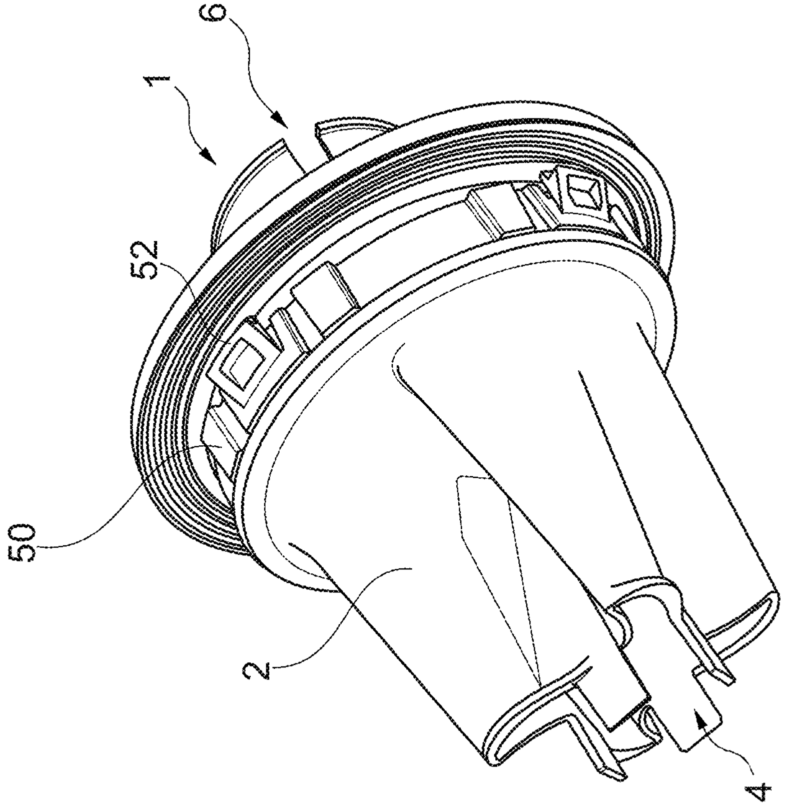
FIG. 14 shows an isometric view of a fourth grommet in accordance with some embodiments.
Figure 15:
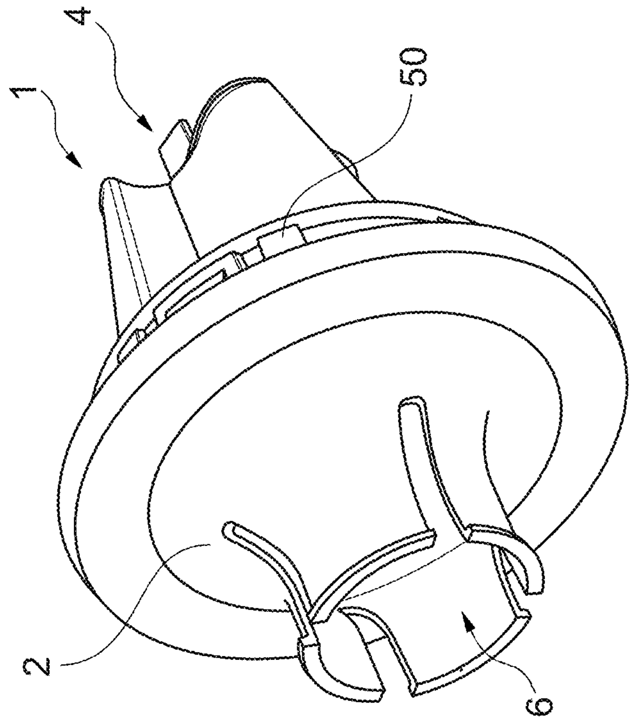
FIG. 15 shows an isometric view of the grommet of FIG. 14 in a different perspective in accordance with some embodiments.
Figure 17:
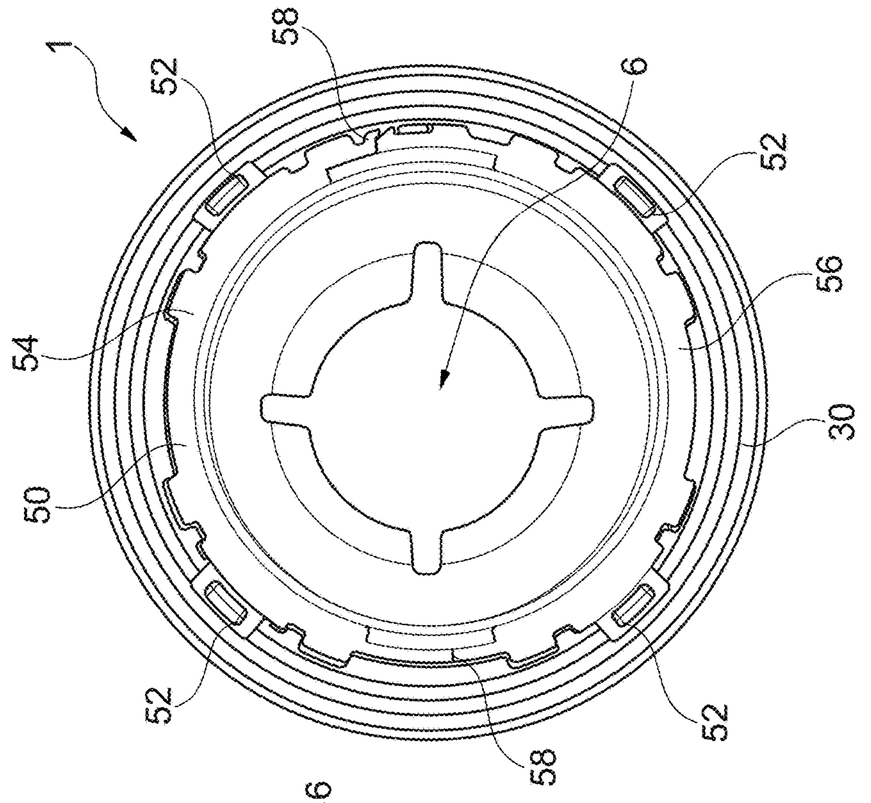
FIG. 17 shows a cross-sectional axial view of the grommet of FIG. 14 in accordance with some embodiments.
Figure 16:
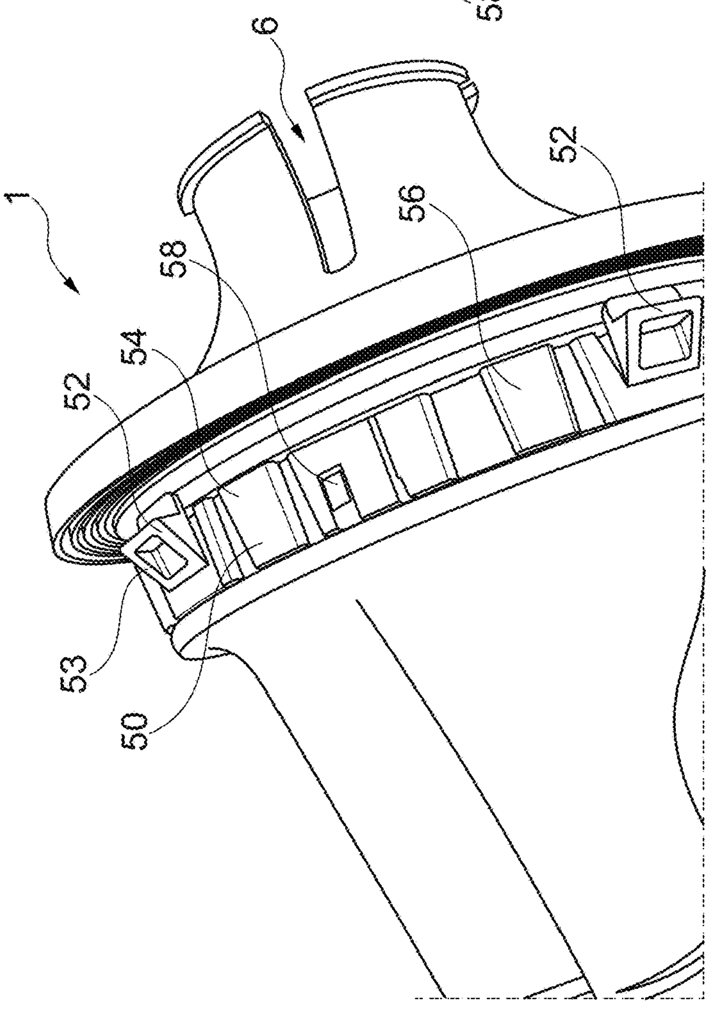
FIG. 16 shows detailed view of the grommet of FIG. 14 showing the connection area of the two-piece ring-shaped plastic clip in accordance with some embodiments.

FIGS. 10, 11, 12, 13A, and 13B show a grommet 1 according to a third embodiment. The grommet 1 of the third embodiment corresponds essentially to the grommet 1 of the second embodiment but instead of a spring element 24 it comprises a ring-shaped stiffness-improvement section 26 for improving the stiffness of the latching collar 23. The stiffness-improvement section 26 is arranged at the latching collar 23 opposite to the conical surface 22. The stiffness-improvement section 26 is integral with the latching collar 23, thus it is made of the same material and can be made during the same manufacturing step. Therefore, no additional spring element is needed to increase the holding force of the latching collar 23. In the shown third embodiment the stiffness-improvement section 26 comprises wall parts 27 and hollow parts 28. The wall parts 27 extend in axial direction x and are arranged in a harmonica fashion around the ring-shape of the stiffness improvement section 26 as best shown in FIGS. 12 and 13B.

Instead of the flat wall parts 27 in harmonica arrangement other hollow elements can be used to form the ring-shaped stiffness-improvement section 26, for example a series of wall parts that extend in axial direction x and have a hollow round or oval section.

FIGS. 14, 15, 16, 17, 18A, and 18B show a grommet 1 according to a fourth embodiment. The grommet 1 of the fourth embodiment corresponds essentially to the grommets 1 of the second and third embodiment but instead of a spring element 24 or a ring-shaped stiffness-improvement section 26 it comprises ring-shaped plastic clip 50 arranged at the second portion P2 for mounting the grommet 1 within a mounting hole of a vehicle. The plastic clip 50 comprises clip elements 52 extending radially to the outside for latching with a mounting hole of a vehicle. The clip elements 52 comprise a slanted surface 53 which allows a clipping with the edge of a mounting hole (not shown). The plastic clip 50 can be made of a more rigid plastic material than the sleeve body 2 to enable a more reliable latching with the mounting hole.

Preferably, the plastic clip 50 it a two-piece element for facilitating mounting of the plastic clip 50 to the second portion P2 of grommet 1. The plastic clip 50 consists of two clip pieces 54, 56 that have snap-lock connection elements 58 for locking the two clip pieces 54, 56 together during mounting of the plastic clip 50 to the second portion P2.

Figure 18A:
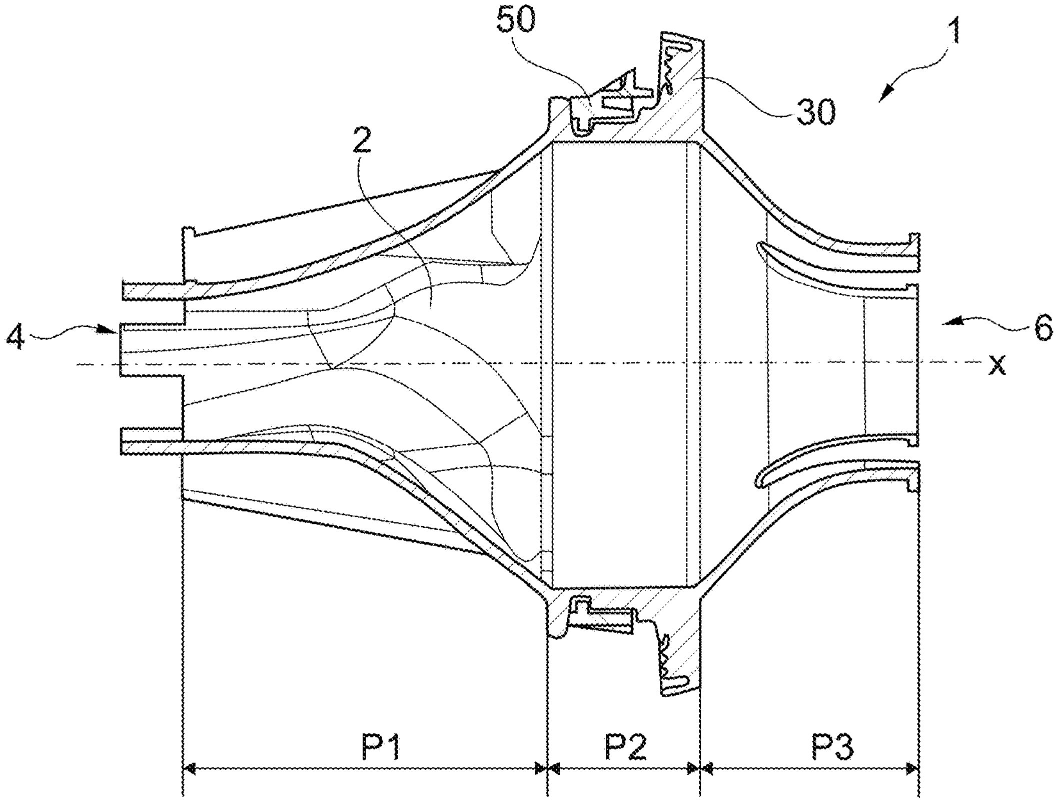
FIG. 18A shows a cross-sectional side view of the grommet of FIG. 14 in accordance with some embodiments.
Figure 18B:
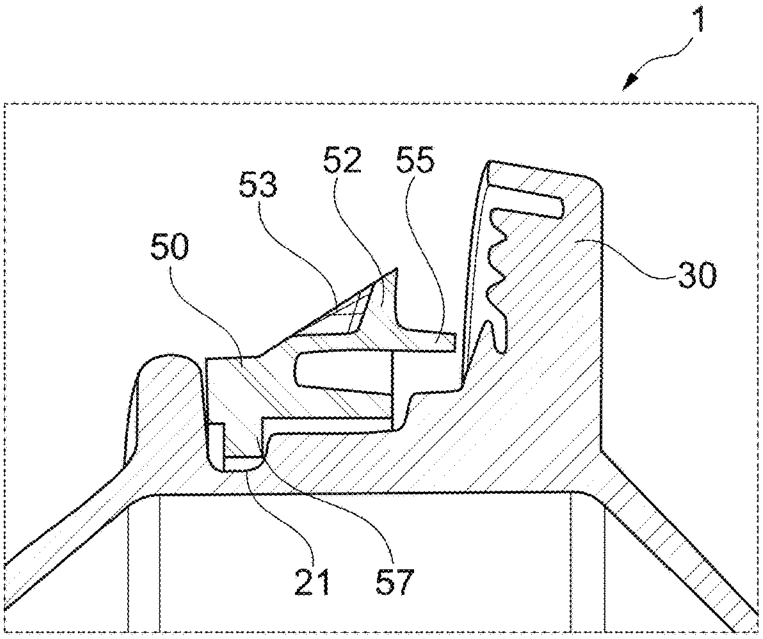
FIG. 18B shows a detailed side view of the grommet of FIG. 14 showing the mounting area of the grommet in more detail in accordance with some embodiments.
Figure 20:
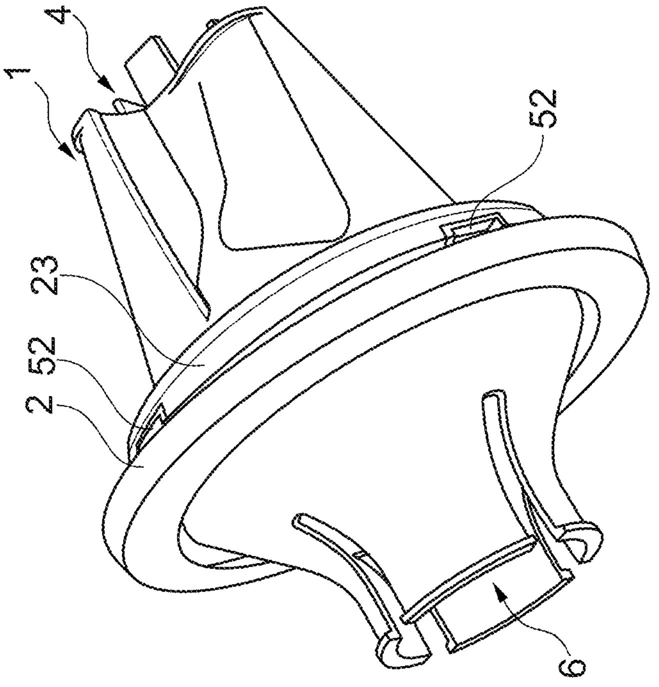
FIG. 20 shows an isometric view of the grommet of FIG. 19 in a different perspective in accordance with some embodiments.
Figure 19:
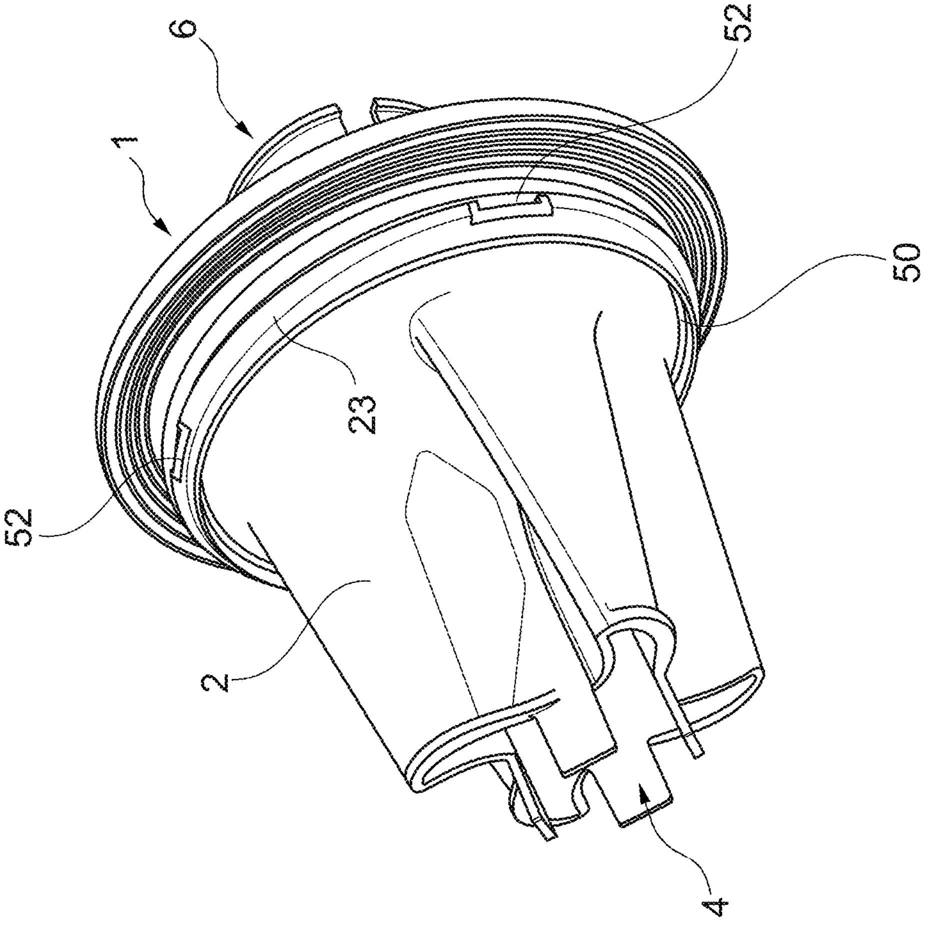
FIG. 19 shows an isometric view of a sixth grommet in accordance with some embodiments.
Figure 21B:
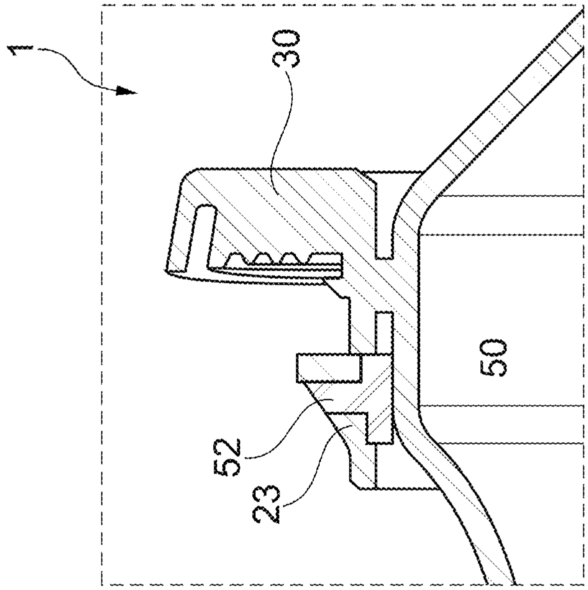
FIG. 21B shows a detail cross-sectional view of the grommet of FIG. 19 showing the mounting area of the grommet in more detail in accordance with some embodiments.
Figure 21A:
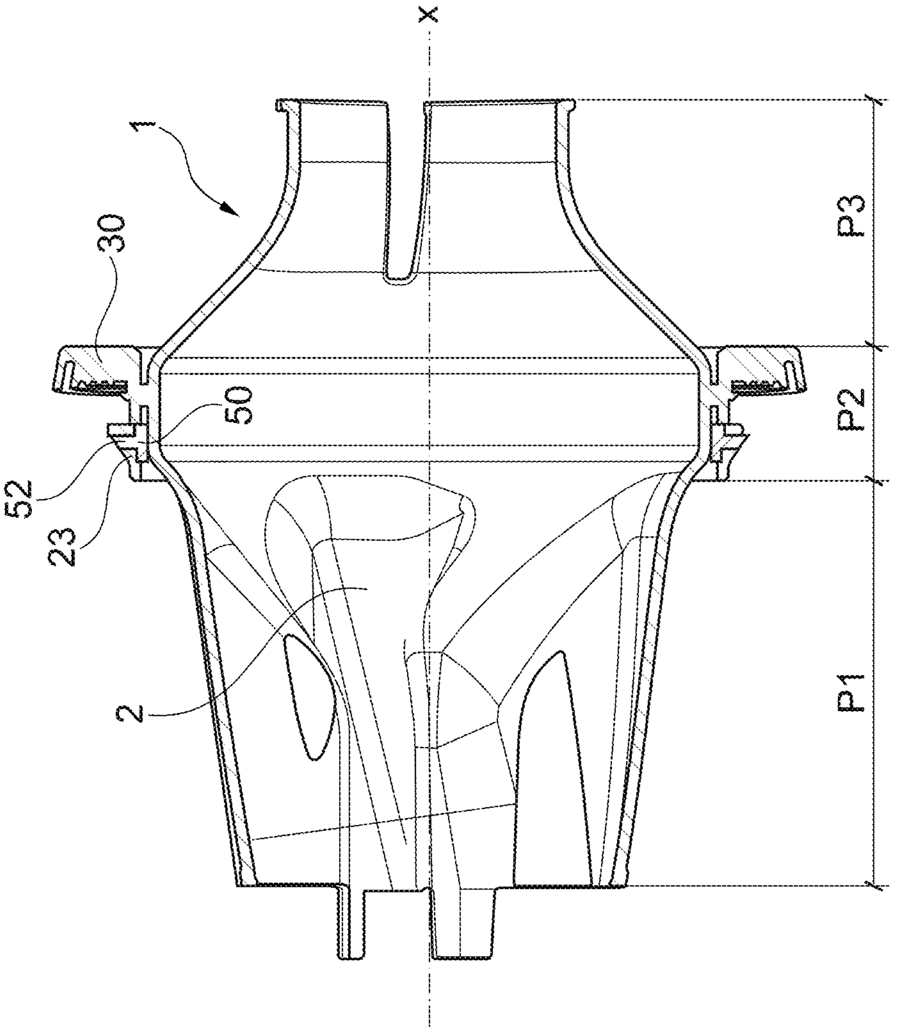
FIG. 21A shows a cross-sectional side view of the grommet of FIG. 19 in accordance with some embodiments.

As particularly shown in FIG. 18B, the clip elements 52 can also comprise centring extensions 55 that extend substantially in axial direction for centring the grommet 1 within the mounting hole.

Further, the plastic clip 50 on its inner side comprises a ring-shaped ridge 57 that extends into a ring-shaped groove at the second portion P2 for holding the plastic clip 50 in-place.

FIGS. 19, 20, 21A, and 21B show a grommet 1 according to a fifth embodiment. The grommet 1 of the fourth embodiment corresponds essentially to the grommets 1 of the second and third embodiment but instead of a spring element 24 or a ring-shaped stiffness-improvement section 26 it comprises a further ring-shaped plastic clip 50, that is partially overmolded by the latching collar 23, wherein at least the clip elements 52 protrude out of the latching collar 23. Since the ring-shaped plastic clip 50 is partially overmolded by the latching collar 21 the plastic clip 50 is inserted into the mould for the grommet 1 prior to injection-moulding. Thus, no further assembly steps are required to integrate the plastic clip 50.

In this fifth embodiment the plastic clip 50 preferably is a one-piece element. The non-overmolded plastic clip elements 52 increase the latching force of the latching collar 23.

While this invention has been described in terms of the preferred embodiments thereof, it is not intended to be so limited, but rather only to the extent assembly forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no feature limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

The term "and/or" is only an association relationship describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A grommet, comprising:

a sleeve body of a flexible material having two opposed openings, a first opening of the two opposed openings having a cross-sectional shape of a propeller as seen in axial insertion direction in unloaded condition.

2. The grommet in accordance with claim 1, wherein the propeller shape comprises at least two blade portions.

3. The grommet in accordance with claim 2, wherein the propeller shape consists of four blade portions.

4. The grommet in accordance with claim 1, wherein the sleeve body has an axial extension comprising a first portion having the cross-sectional shape of a propeller as seen in the axial insertion direction.

5. The grommet in accordance with claim 4, wherein the sleeve comprises a second portion having a cross-sectional shape of a circle.

6. The grommet in accordance with claim 4, wherein the first portion has an extension of at least 30% of a total axial length of the sleeve body.

7. The grommet in accordance with claim 4, wherein the second portion comprises a latching collar with a conical surface and a flange for mounting the grommet within a mounting hole of a vehicle.

8. The grommet in accordance with claim 7, wherein the latching collar further comprises a spring element for increasing stiffness of the latching collar.

9. The grommet in accordance with claim 8, wherein the spring element is made of material having greater rigidity than the material of the latching collar.

10. The grommet in accordance with claim 7, wherein the latching collar further comprises a ring-shaped stiffness-improvement section opposite to the conical surface, wherein the stiffness-improvement section is integral with the latching collar.

11. The grommet in accordance with claim 10, wherein the latching collar comprises wall parts and hollow parts.

12. The grommet in accordance with claim 10, wherein the wall parts extend in axial direction and are arranged in a harmonica fashion around the ring-shape of the stiffness-improvement section.

13. The grommet in accordance with claim 7, further comprising a ring-shaped plastic clip arranged at the second portion for mounting the grommet within a mounting hole of a vehicle.

14. The grommet in accordance with claim 13, wherein the plastic clip comprises clip elements extending radially to the outside for latching with a mounting hole of a vehicle.

15. The grommet in accordance with claim 13, wherein the plastic clip consists of two clip pieces that have snap-lock connection elements for locking the two clip pieces together during mounting of the plastic clip to the second portion.

16. The grommet in accordance with claim 13, wherein the plastic clip is partially overmolded by the latching collar.

17. The grommet in accordance with claim 16, wherein the clip elements are not overmolded.

18. The grommet in accordance with claim 4, wherein the sleeve body further comprises a third portion that extends in axial direction from the second portion opposite to the first portion.

19. The grommet in accordance with claim 18, wherein the third portion has a substantially round section and comprises axial slots.

20. The grommet in accordance with claim 1, wherein the propeller shape of the opening is adapted to be unfoldable, wherein the propeller shape of the opening, in an unfolded condition, has a cross-sectional area of 1.5 to 3 times that of the propeller shape of the opening in a folded condition, without stretching the material.

* * * * *